US012421869B2

(12) United States Patent
Sharma

(10) Patent No.: US 12,421,869 B2
(45) Date of Patent: Sep. 23, 2025

(54) TORSIONAL VIBRATION DAMPER MECHANISM FOR GAS TURBINE ENGINE

(71) Applicant: General Electric Company, Cincinnati, OH (US)

(72) Inventor: Praveen Sharma, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/784,078

(22) Filed: Jul. 25, 2024

(65) Prior Publication Data

US 2025/0188850 A1 Jun. 12, 2025

(30) Foreign Application Priority Data

Dec. 11, 2023 (IN) ............................ 202311084357

(51) Int. Cl.
*F01D 25/04* (2006.01)

(52) U.S. Cl.
CPC .......... *F01D 25/04* (2013.01); *F05D 2240/60* (2013.01); *F05D 2260/96* (2013.01)

(58) Field of Classification Search
CPC ... F01D 25/04; F05D 2240/60; F05D 2260/96
See application file for complete search history.

(56) References Cited

U.S. PATENT DOCUMENTS 3,632,222 A * 1/1972 Cronstedt ................. F02C 7/36 416/500
4,973,221 A * 11/1990 Anderson ............... F16C 27/04 188/379
6,249,070 B1 * 6/2001 Sharp .................... B60R 16/027 310/90.5
6,378,293 B1 * 4/2002 Care .................. F16C 32/0474 310/90.5
7,438,165 B2 * 10/2008 Nerubenko ......... F16F 15/1407 74/574.2
7,694,540 B2 * 4/2010 Ishida ..................... D06F 37/20 384/624
7,923,874 B2 * 4/2011 Himmelmann ...... H02K 7/1807 310/75 D
10,041,575 B2 * 8/2018 Basin ................ F16F 15/12366
10,281,025 B2 5/2019 Sheridan
10,487,839 B2 * 11/2019 Kupiszewski ............ F02C 3/04
10,612,620 B2 * 4/2020 Manzoor ............... F16F 15/126
10,851,870 B2 * 12/2020 Manzoor ............. F16F 15/1442
10,927,891 B2 2/2021 Ciciriello et al.
11,585,235 B2 * 2/2023 Unton ..................... F01D 25/04
11,828,235 B2 * 11/2023 Pankaj ...................... F02C 7/36

(Continued)

FOREIGN PATENT DOCUMENTS

KR 20210063566 A 6/2021

*Primary Examiner* — Jesse S Bogue

(74) *Attorney, Agent, or Firm* — Venable LLP; Michele V. Frank

(57) ABSTRACT

A torsional vibration damper mechanism for damping torsional vibration of a first drive shaft, a second drive shaft, or both. The torsional vibration damper mechanism includes a third drive shaft mechanically coupled to the first drive shaft, the second drive shaft, or both. The third drive shaft is configured to reduce or substantially to eliminate torsional vibration in the first drive shaft, the second drive shaft, or both.

20 Claims, 5 Drawing Sheets

(56) References Cited

U.S. PATENT DOCUMENTS

| | | | | |
|---|---|---|---|---|
| 2007/0006393 | A1* | 1/2007 | Ishida | D06F 37/20 68/23.1 |
| 2008/0047392 | A1 | 2/2008 | Ciaccio | |
| 2009/0272108 | A1* | 11/2009 | Degler | F16F 15/12353 60/338 |
| 2012/0214605 | A1* | 8/2012 | Snook | F01D 15/10 464/68.41 |
| 2013/0186105 | A1* | 7/2013 | Meacham | F16F 15/131 60/797 |
| 2015/0010387 | A1 | 1/2015 | Daimer | |
| 2016/0169281 | A1 | 6/2016 | Ertas et al. | |
| 2017/0198783 | A1* | 7/2017 | Bouzit | F16F 15/1208 |
| 2018/0252165 | A1* | 9/2018 | Blaney | F16H 57/025 |
| 2021/0277800 | A1 | 9/2021 | Ganiger et al. | |
| 2022/0178310 | A1 | 6/2022 | Pankaj et al. | |
| 2024/0352894 | A1* | 10/2024 | Alecu | F02C 7/36 |

* cited by examiner

TORSIONAL VIBRATION DAMPER MECHANISM FOR GAS TURBINE ENGINE

CROSS REFERENCE TO RELATED APPLICATIONS

The present application claims the benefit of Indian Patent Application number 202311084357, filed on Dec. 11, 2023, which is hereby incorporated by reference herein in its entirety.

TECHNICAL FIELD

The present disclosure relates generally to drive shafts in a gas turbine engine, and, in particular, to a torsional vibration damper mechanism for a gas turbine engine.

BACKGROUND

Engines, and, particularly, gas or combustion turbine engines, are rotary engines that extract energy from a flow of combustion gases passing through the engine onto a multitude of turbine blades. Turbine engines have been used for land and nautical locomotion, and power generation. Turbine engines are commonly used for aeronautical applications such as for aircraft, including helicopters and airplanes. In aircraft, turbine engines are used for propulsion of the aircraft. In terrestrial applications, turbine engines are often used for power generation.

Complex machines such as turbine engines include rotating systems to convert energy to work or to transfer rotation from one component to another, using, for example, a gear rotating drive shaft and, in some situations, a gearbox. Vibration in components or parts including drive shafts during operation add stress to the components or the part, which may lead to potential failure.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
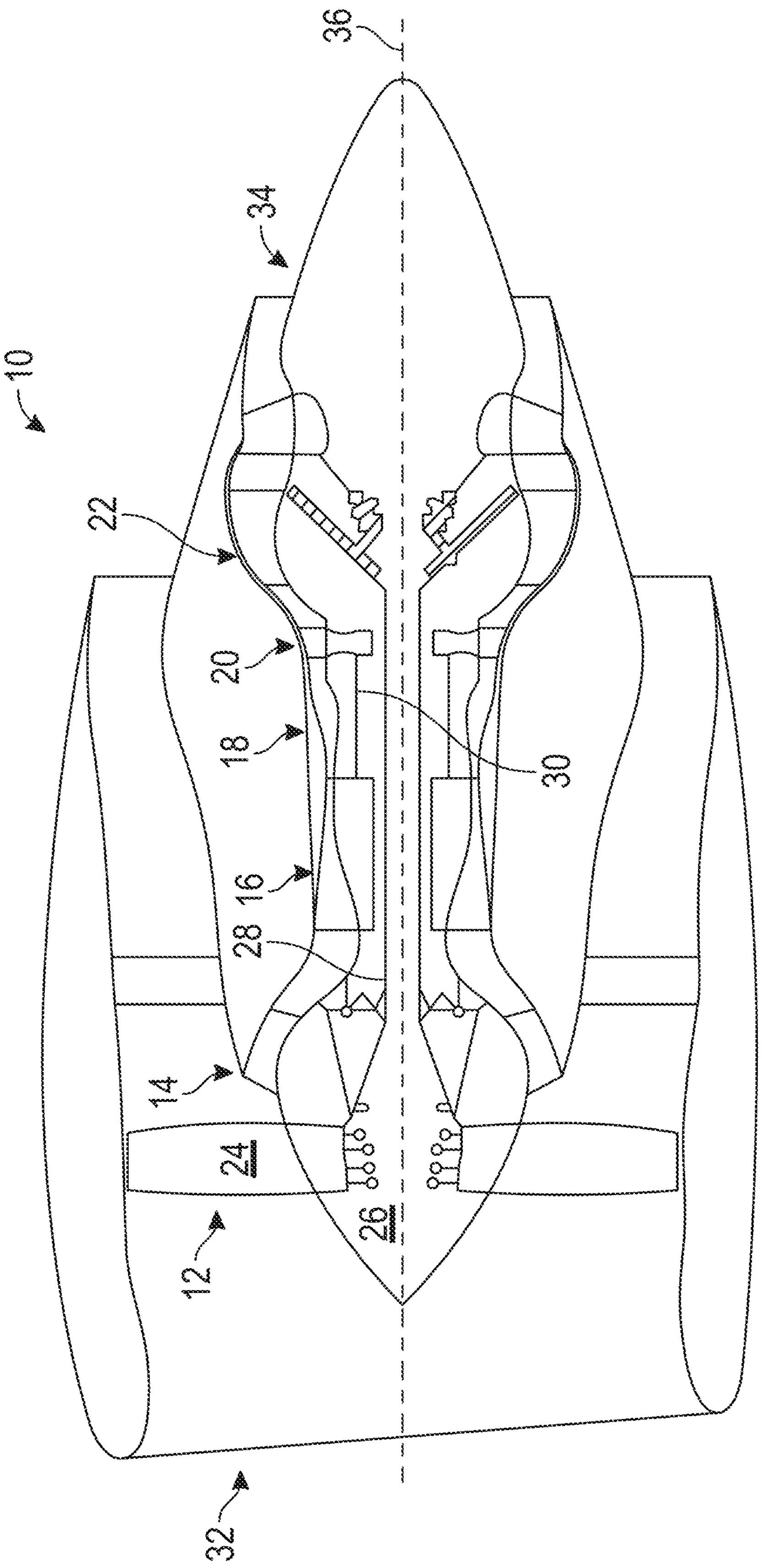
FIG. 1 is a schematic diagram of a turbine engine, according to an embodiment of the present disclosure.

Additional features, advantages, and embodiments of the present disclosure are set forth or apparent from consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and scope of the present disclosure.

In the following specification and the claims, reference may be made to "optional" or "optionally" to mean that the subsequently described event or circumstance may or may not occur, and that the description includes instances in which the event occurs and instances in which the event does not.

As used herein, the terms "axial" and "axially" refer to directions and orientations that extend substantially parallel to a centerline of the turbine engine or the combustor. Moreover, the terms "radial" and "radially" refer to directions and orientations that extend substantially perpendicular to the centerline of the turbine engine. A turbine engine includes, for example, a turbojet engine, a turboprop engine, a turbofan, or a turboshaft engine.

Embodiments of the present disclosure seek to provide a system and a method to dampen torsional vibration of a shaft. A shaft, such as a slender shaft, may have a relatively high inertia that may lead to torsional vibration in the shaft. For example, a connection of a low-pressure and/or a booster compressor (LPC) assembly coupled to a forward fan assembly and to the low-pressure (LP) drive shaft may induce torsional vibration in the LP drive shaft. In addition, a presence of a gearbox between the LPC assembly and the LP drive shaft may further excite torsional vibration responses in the LP drive shaft. Therefore, in order to reduce or substantially to eliminate the torsional vibration, a torsional vibration damper mechanism is used. For example, the torsional vibration damper mechanism can be provided integrated with a rotating shaft at any place where damper effectiveness can be maximized."

In some embodiments, the torsional vibration mechanism includes aligning two distinct mode shapes of a main shaft and an integrated shaft with flexible attachments, to limit the response by aligning nodes with antinodes to limit the response. This mechanism can be put at any place where damper effectiveness is desired and space is available.

In some embodiments, the torsional vibration damper mechanism may include viscoelastic materials or smart materials such as a shape memory alloy (SMA). Alternatively, or additionally, a trapped high viscous fluid can be used for dampening torsional vibration.

In some embodiments, a combination of stiff and flexible members can be provided with vibration damping inserts. For example, the vibration damping inserts may include inverted Y-beam inserts coupling an inertia inner ring to one or more outer rings. The inverted Y-beam inserts can be tuned for torsional mode of interest. The inserts can also include a viscoelastic material.

Any torque fluctuation leads to displacement of flexible members or shafts against the damping element. Benefits of using a torsional vibration mechanism include, but are not limited to, providing controlled torsional vibrations for slender architectures. Rotor components relieved from high torque pulsations otherwise might be a concern for high cycle fatigue (HCF).

FIG. 1 is a schematic diagram of a turbine engine 10, according to an embodiment of the present disclosure. The turbine engine 10 includes a fan assembly 12, a low-pressure and/or a booster compressor (LPC) assembly 14, a high-pressure compressor (HPC) assembly 16, and a combustor assembly 18. Fan assembly 12, LPC assembly 14, HPC assembly 16, and combustor assembly 18 are coupled in flow communication. The turbine engine 10 also includes a high-pressure turbine (HPT) assembly 20 coupled in flow communication with the combustor assembly 18 and a low-pressure turbine (LPT) assembly 22. The fan assembly 12 includes an array of fan blades 24 extending radially outward from a rotor disk 26. The LPT assembly 22 is coupled to the fan assembly 12 and the LPC assembly 14 through a first drive shaft 28 (LP shaft), and the HPT assembly 20 is coupled to the HPC assembly 16 through a second drive shaft 30 (HP shaft). The turbine engine 10 has an intake 32 and an exhaust 34. The turbine engine 10 has a centerline (axis) 36 about which the fan assembly 12, the LPC assembly 14, the HPC assembly 16, the HPT assembly 20, and the LPT assembly 22 rotate.

In operation, air entering the turbine engine 10 through intake 32 is channeled through the fan assembly 12 towards the LPC assembly 14. Compressed air is discharged from the LPC assembly 14 towards the HPC assembly 16. Highly compressed air is channeled from the HPC assembly 16 towards the combustor assembly 18, mixed with fuel, and the mixture of air and fuel is burned within the combustor assembly 18. High temperature combustion gas generated by the combustor assembly 18 is channeled towards the HPT assembly 20 and the LPT assembly 22. Combustion gas is subsequently discharged from the turbine engine 10 via an exhaust 34.

Figure 2:
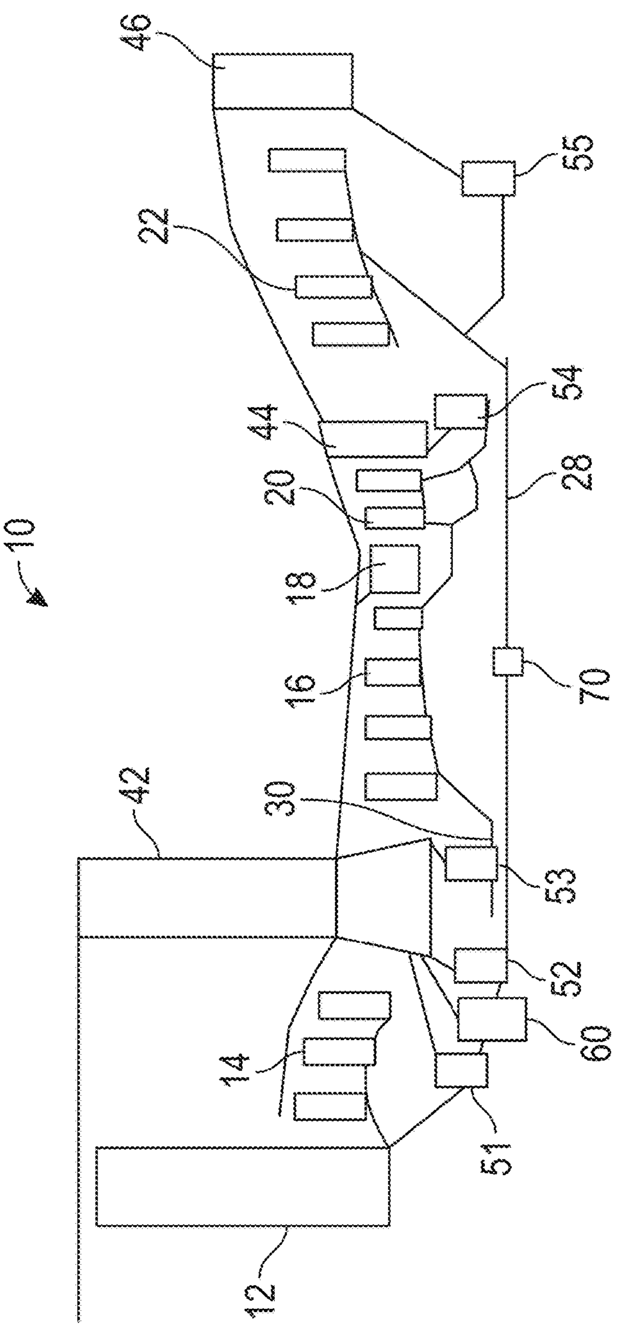
FIG. 2 is schematic diagram of the turbine engine showing connection among a fan assembly, an LPC assembly, an LPT assembly through a first drive shaft, and a connection between an HPC assembly and an HPT assembly via a second drive shaft, according to an embodiment of the present disclosure.

FIG. 2 is schematic diagram of the turbine engine 10 showing connections between the fan assembly 12, the LPC assembly 14, and the LPT assembly 22 through the first drive shaft 28, and a connection between the HPC assembly 16 and the HPT assembly 20 via the second drive shaft 30, according to an embodiment of the present disclosure. As shown in FIG. 2, the turbine engine 10 also includes a plurality of stator assemblies 42, 44, and 46. The stator assembly 42 is provided between the LPC assembly 14 and the HPC assembly 16. The stator assembly 44 is provided between the HPT assembly 20, and the LPT assembly 22. The stator assembly 46 is provided at a back end of the LPT assembly 22. The combustor assembly 18 is provided between the HPC assembly 16 and the HPT assembly 20. The turbine engine 10 also includes a plurality of bearings 51, 52, 53, 54, and 55. The plurality of bearings 51, 52, 53, 54, and 55 are provided at different points to connect the LPC assembly 14, the HPC assembly 16, the HPT assembly 20 and the LPT assembly 22 with the stator assembly 42, the stator assembly 44 and the stator assembly 46, respectively. In an embodiment, a gearbox 60 may be provided between the LPC assembly 14 and the first drive shaft 28. For example, the gearbox 60 may be provided between the bearing 51 and the bearing 52 connected to the stator assembly 42. The gearbox 60 may be used to change a rotation speed transmitted from the LPC assembly 14 and the first drive shaft 28.

In an embodiment, the first drive shaft 28 (LP shaft) may have a relatively high inertia relative to other rotating components such that may lead to torsional vibration in the first drive shaft 28. For example, the first drive shaft 28 (LP shaft) may have relatively high inertia towards the ends of shaft as it is connected to the fan assembly 12 which has a relatively a greater mass and/or a greater radius than the mass and/or radii of other rotating components (e.g., other fan blades in the LPT). In general, since the moment of inertia of an object is proportional to a mass of the object and a radius of the object, a greater mass and/or radius would lead to a higher moment of inertia. For example, a connection of the LPC assembly 14, which is coupled to the forward fan assembly 12 via the first drive shaft 28, may induce torsional vibration in the first drive shaft 28. In addition, the gearbox 60 provided between the LPC assembly 14 and the first drive shaft 28 may further excite torsional vibration responses in the first drive shaft 28. Unwanted torsional vibration in the first drive shaft 28 should be eliminated since the vibration can introduce stress over time on the first drive shaft 28 itself and other components or assemblies coupled to the first drive shaft 28. Therefore, in order to reduce or substantially to eliminate the torsional vibration, a torsional vibration damper mechanism 70 is used. The tortional mechanism 70 will be described in detail in the following paragraphs. In an embodiment, as shown in FIG. 2, the torsional vibration damper mechanism 70 can be provided between the fan assembly 12 and LPC assembly 14 and the LPT assembly 22 via the first drive shaft 28. For example, the torsional vibration damper mechanism 70 can be integrated with a rotating shaft at any place where damper effectiveness can be enhanced or maximized. The term "substantially to eliminate" is used herein to mean eliminating at least 95% of unwanted torsional vibration.

Figure 3A:
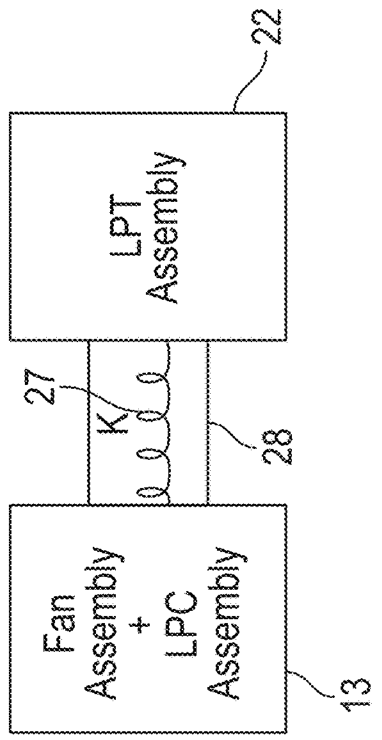
FIG. 3A is a schematic diagram representing a vibrational torsional coupling between the fan assembly, together with the LPC assembly, and the LPT assembly via the first drive shaft, according to an embodiment of the present disclosure.

FIG. 3A is a schematic diagram representing a vibrational torsional coupling between the fan assembly 12, together with the LPC assembly 14, and the LPT assembly 22 via the first drive shaft 28, according to an embodiment of the present disclosure. In FIG. 3A, the fan assembly 12 (shown in FIG. 2) together with the LPC assembly 14 (shown FIG. 2) is represented schematically by box 13. The first drive shaft 28 couples the box 13, schematically representing the fan assembly 12 together with the LPC assembly 14, to the LPT assembly 22. In this configuration, the first drive shaft 28 can have a certain stiffness depicted schematically by a spring 27 having a constant K representing the vibrational tortional coupling of the first drive shaft 28. FIG. 3A depicts schematically the configuration shown in FIG. 2.

Figure 3B:
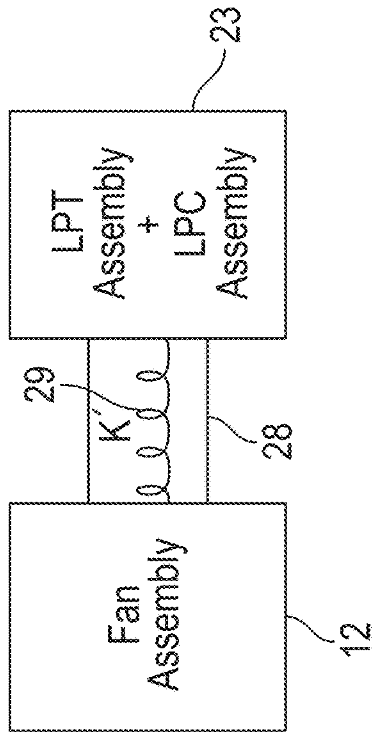
FIG. 3B is a schematic diagram representing a vibrational torsional coupling between the fan assembly and the LPT assembly, together with the LPC assembly, via the first drive shaft, according to another embodiment of the present disclosure.

FIG. 3B is a schematic diagram representing a vibrational torsional coupling between the fan assembly 12 to the LPT assembly 22 (shown in FIG. 2) together with the LPC assembly 14 (shown in FIG. 2) via the first drive shaft 28, according to another embodiment of the present disclosure. In FIG. 3B, the LPT assembly 22 together with the LPC assembly 14 is represented schematically by box 23. The first drive shaft 28 couples the fan assembly 12 to the box 23, schematically representing the LPT assembly 22 together with the LPC assembly 14. In this configuration, the first drive shaft 28 can have another stiffness depicted schematically by a spring 29 having a constant K' representing the vibrational tortional coupling of the first drive shaft 28.

Although the vibrational torsional coupling is described in the above paragraphs as being in the first drive shaft 28 (LP shaft), the torsional vibrational coupling can also be equally present in the second drive shaft 30 (HP shaft). Therefore, the torsional vibration damper mechanism 70 can also be used in the second drive shaft 30 (HP shaft). For example, a first torsional vibration damper mechanism can be used in the first drive shaft 28 and a second torsional vibration damper mechanism, separate from the first torsional vibration damper mechanism, can be used in the second drive shaft 28. The torsional vibration damper mechanism 70 can be used as the first torsional vibration damper mechanism or the second torsional vibration damper mechanism.

In the following paragraphs, the torsional vibration damper mechanism 70 is described as being used in the first drive shaft 28. However, alternatively or additionally, the torsional vibration damper mechanism 70 can also be used in the second drive shaft 30.

Figure 4:
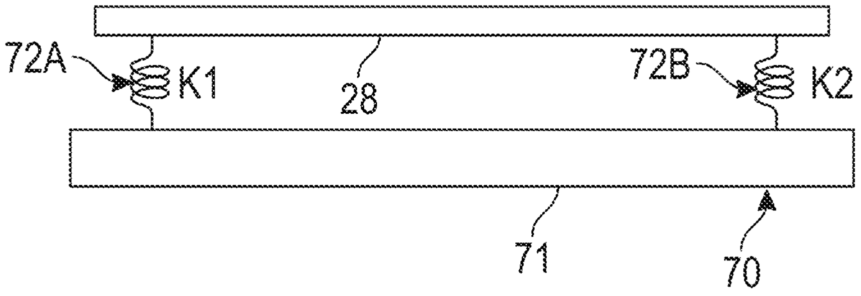
FIG. 4 is a schematic diagram of a torsional vibration damper mechanism coupled to the first drive shaft to reduce torsional vibration in the first drive shaft, according to an embodiment of the present disclosure.

FIG. 4 is a schematic diagram of the torsional vibration damper mechanism 70 coupled to the first drive shaft 28 to reduce torsional vibration in the first drive shaft 28, according to an embodiment of the present disclosure. In this embodiment, the torsional vibration damper mechanism 70 can be, for example, a mass that is coupled to the first drive shaft 28. For example, the mass can be heavier or provided with a larger dimension (e.g., a larger radius, etc.) to increase the moment of inertia and thus reduce the propensity for torsional vibration of the first drive shaft 28. For example, as shown in FIG. 4, the mass can be a third drive shaft 71 mechanically coupled to the first drive shaft 28 using mechanical couplings 72A and 72B. As shown in FIG. 4, the third drive shaft 71 is coupled to the first drive shaft 28 at spaced apart locations. The third drive shaft 71 is coupled to the first drive shaft 28 at a first location using the mechanical coupling 72A to provide a first coupling spring constant K1 and at a second location, spaced apart from the first location, using the mechanical coupling 72B to provide a second coupling spring constant K2. For example, the third drive shaft 71 can have a larger radius and/or a greater mass than the radius and/or the mass of the first drive shaft 28.

As shown in FIG. 4, the mechanical coupling 72A has a first coupling spring constant K1 (at a first location) and the mechanical coupling 72B has a second coupling spring constant K2 (at a second location). In an embodiment, the second coupling spring constant K1 can be greater than the first coupling spring constant K1 (K2>K1). Therefore, the coupling between the third drive shaft 71 and the first drive shaft 28 is stiffer (or more rigid) at the second location than the coupling between the third drive shaft 71 and the first drive shaft 28 at the first location. In an embodiment, the coupling between the first drive shaft 28 and the third drive shaft 71 at the first location (i.e., the first coupling spring constant K1) can be tuned to reduce or substantially to eliminate torsional vibration in the first drive shaft 28. In an embodiment, a tuned spring stiffness K1, first location (i.e., coupling axial location), and secondary shaft geometry can be selected to achieve desired mode shape of third shaft drive shaft to reduce or substantially to eliminate vibration in the first drive shaft 28. Therefore, instead of, or in addition to, providing the third drive shaft 71 with a higher mass and/or higher radius than the mass or radius of the first drive shaft 28, the coupling stiffness between the third drive shaft 71 and the first drive shaft 28, or the coupling position (the first location) can be selected to reduce or substantially to eliminate torsional vibration in the first drive shaft 28.

Figure 5:
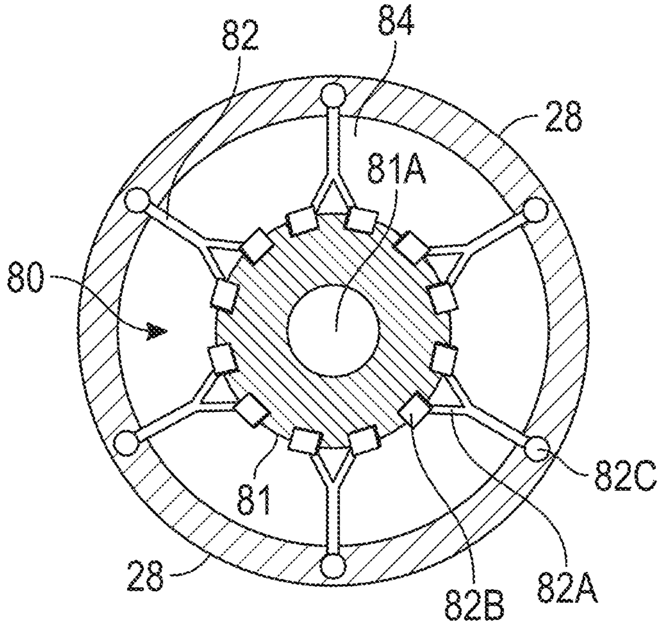
FIG. 5 is a schematic cross-sectional view of the first drive shaft employing a torsional vibration damper mechanism, according to another embodiment of the present disclosure.

FIG. 5 is a schematic cross-sectional view of the first drive shaft 28 employing a torsional vibration damper mechanism 80, according to another embodiment of the present disclosure. As shown in FIG. 5, the torsional vibration damper mechanism 80 is coupled to the first drive shaft 28. In this embodiment, the torsional vibration damper mechanism 80 includes a third drive shaft 81. In an embodiment, the third drive shaft 81 of the torsional vibration damper mechanism 80 is a hollow drive shaft provided within the first drive shaft 28. The third drive shaft 81 can have a hollow cavity 81A. The first drive shaft 28 is a hollow drive shaft. The first drive shaft 28 has a hollow cavity 84. The third drive shaft 81 is an inner shaft arranged within the cavity 84 of the first drive shaft 28. In an embodiment, a dimension (e.g., radius, length) of the third drive shaft 81 is less than a dimension (e.g., radius, length) of the first drive shaft 28. In an embodiment, a mass of the third drive shaft 81 is greater than a mass of the first drive shaft 28 and/or the second drive shaft 30.

In some embodiments, the vibrational mode shapes of the first drive shaft 28 and/or the second drive shaft 30 can be aligned with the vibrational mode shapes of the torsional vibration damper mechanism 80 to reduce torsional vibration in the first drive shaft 28. Flexible attachments can be used to couple the torsional vibration damper mechanism 80 to the first drive shaft 28 to limit vibration response by aligning nodes of the first drive shaft 28 with antinodes of the torsional vibration damper mechanism 80 to limit the response. The torsional vibration damper mechanism 80 can be put at any place where damper effectiveness is desired and space is available.

In some embodiments, in addition to the third drive shaft 81, the torsional vibration damper mechanism 80 further includes a plurality of vibration damping inserts 82 that are provided in the cavity 84 between the third drive shaft 81 and the first drive shaft 28. The plurality of vibration damping inserts 82 may include a combination of stiff members and flexible members. For example, the plurality of vibration damping inserts 82 may include a plurality of inverted Y-beam inserts 82A to couple the third drive shaft 81 of the torsional vibration damper mechanism 80 to the first drive shaft 28. The plurality of inverted Y-beam inserts 82A can be tuned for a torsional vibration mode of interest in the first drive shaft 28. The plurality of vibration damping inserts 82 may further include a plurality of damping elements 82B. The plurality of damping elements 82B are configured to couple the plurality of inverted Y-beam inserts 82A to the third drive shaft 81 of the torsional vibration damper mechanism 80. The plurality of vibration damping inserts 82 may also include a plurality of coupling elements 82C. The plurality of coupling elements 82C are configured to couple the plurality of inverted Y-beam inserts 82A to the first drive shaft 28. In an embodiment, the plurality of damping elements 82B may include a viscoelastic material such as a shape memory alloy (SMA). In another embodiment, the plurality of damping elements 82B may include a spring and/or a viscous fluid to provide spring compression and/or fluid friction damping. Alternatively, or additionally, a trapped viscous fluid can also be provided in the cavity 84 between the third drive shaft 81 of the torsional vibration damper mechanism 80 and the first drive shaft 28 to further dampen torsional vibration.

Figure 6A:
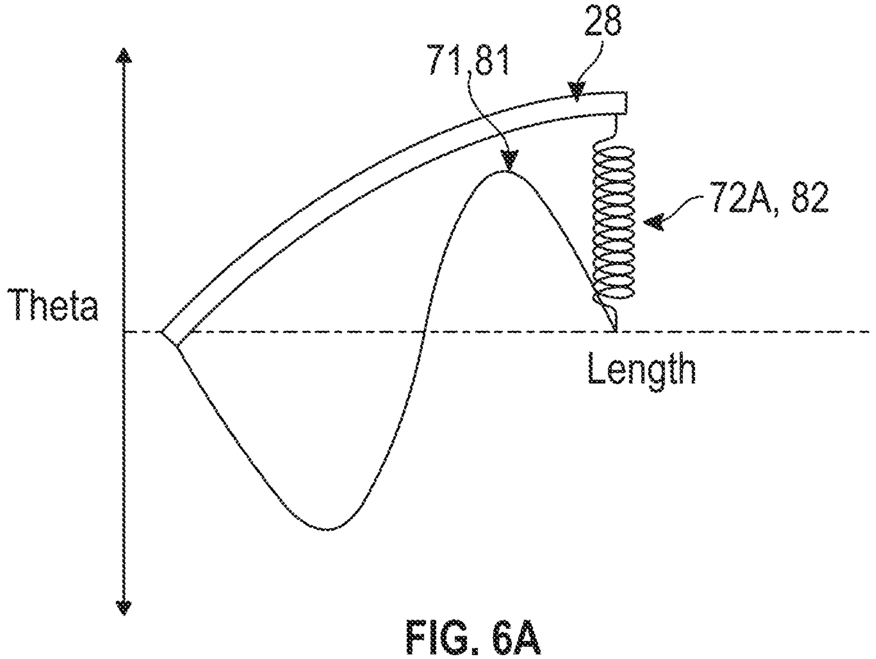
FIGS. 6A and 6B each shows a plot of a torsional vibration theta versus a length of the first drive shaft and a length of the third drive shaft of the torsional vibration damper mechanism, according to an embodiment of the present disclosure.
Figure 6B:
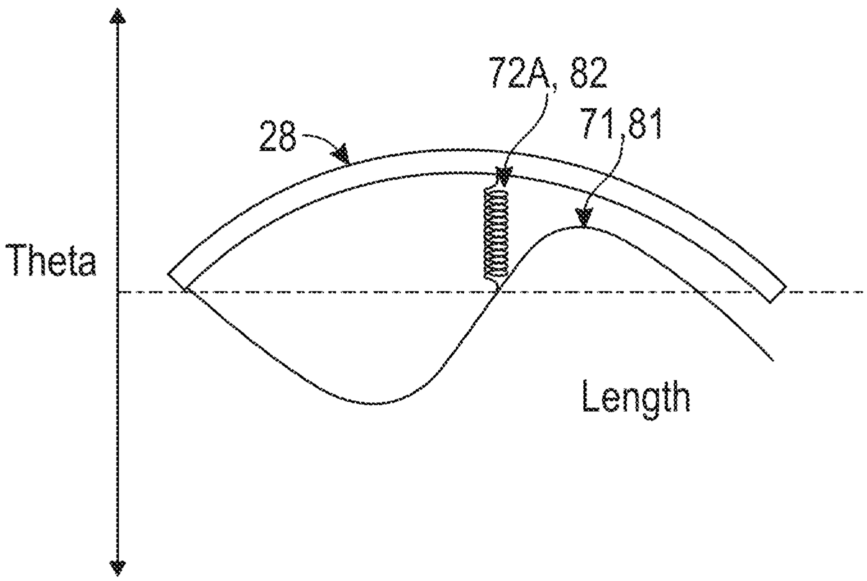

FIGS. 6A and 6B each shows a plot of a torsional vibration theta versus a length of the first drive shaft 28 and/or the second drive shaft 30 (shown in FIG. 2) and a length of the third drive shaft 71, 81 of the torsional vibration damper mechanism 70 (shown in FIG. 4), 80 (shown in FIG. 5), according to embodiments of the present disclosure. As shown in FIGS. 6A and 6B, the first drive shaft 28 has a first oscillation mode where the torsional amplitude theta increases with increasing length of the first drive shaft 28. The third drive shaft 71, 81 has a second oscillation mode where the torsional amplitude theta increases negatively and then increases positively and crosses a first node (zero amplitude), and decreases again to a second node (zero amplitude), with increasing length of the first drive shaft 28. The third drive shaft 71, 81 having the second oscillation mode is coupled to the first drive shaft 28 having the first oscillation mode to limit angular torsion or twist in the first drive shaft 28. The second oscillation mode of the third drive shaft 71, 81 limits or reduces the first oscillation mode of the first drive shaft 28.

The coupling of the third drive shaft 71, 81 to the first drive shaft 28 can be a direct coupling or a coupling through the mechanical coupling 72A or the plurality of vibration damping inserts 82. As shown in FIG. 6A, the coupling of the third drive shaft 71, 81 to the first drive shaft 28 is enabled at a first position (length). As shown in FIG. 6B, the coupling of the third drive shaft 71, 81 to the first drive shaft 28 is enabled at a second position (length) different from the first length. Therefore, the torsional vibration dampening can be adjusted by adjusting the position (or length) of the of the third drive shaft 71, 81 of the torsional vibration damper mechanism 70, 80 relative to a position of the first drive shaft 28.

The torsional vibration mechanism 70, 80 is described in the above paragraphs being used to dampen or to reduce or substantially to eliminate torsional vibration in the first drive shaft 28. However, alternatively or in addition, the torsional vibration mechanism 70, 80 can also be used to dampen or to reduce or substantially to eliminate torsional vibration in the second drive shaft 30. Therefore, the above description of the tortional vibration mechanism 70, 80 with respect to the first drive shaft 28 is also applicable to the second drive shaft 30.

Figure 7:
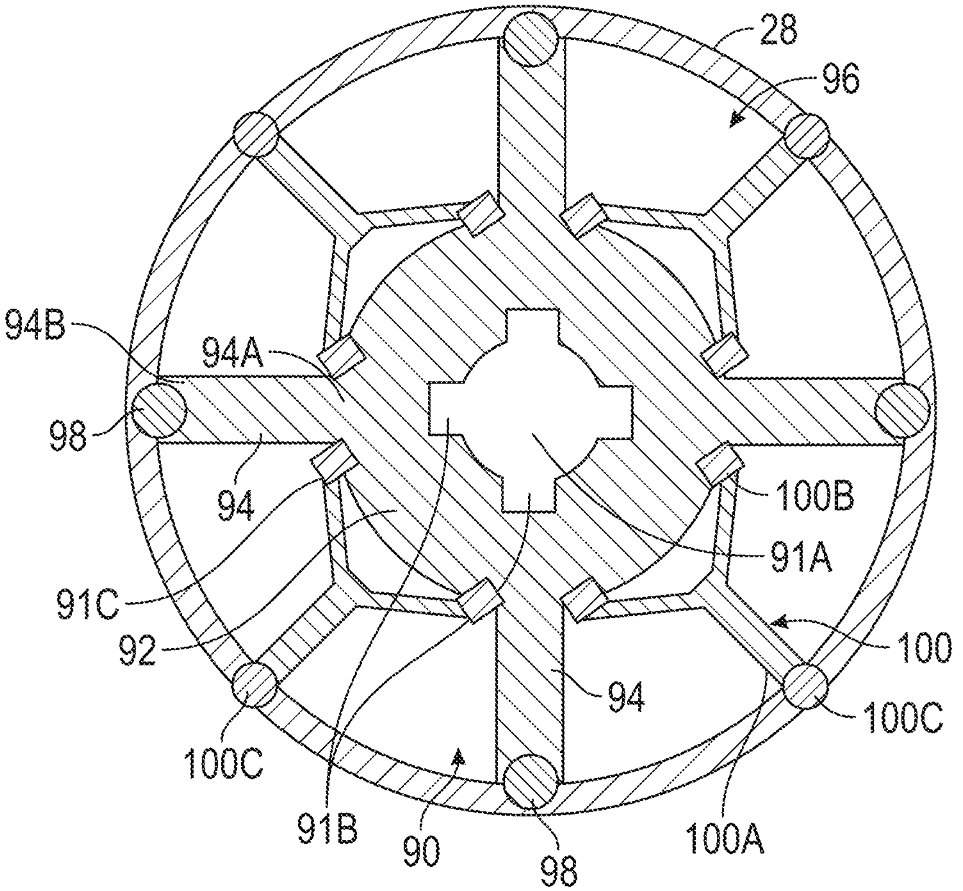
FIG. 7 is a schematic cross-sectional view of the first drive shaft employing another torsional vibration damper mechanism, according to another embodiment of the present disclosure.

FIG. 7 is a schematic cross-sectional view of the first drive shaft 28 employing a torsional vibration damper mechanism 90, according to another embodiment of the present disclosure. As shown in FIG. 7, the torsional vibration damper mechanism 90 is coupled to the first drive shaft 28. In this embodiment, the torsional vibration damper mechanism 90 includes an inner disk 92 and a plurality of torque transmission struts 94 configured to couple the first drive shaft 28 with the third drive shaft 81 (not shown in FIG. 7 but shown in FIG. 5). As shown in FIG. 7, four torque transmission struts 94 are provided. However, any number of torque transmission struts 94 (e.g., two or more torque transmission struts) can be used. The inner disk 92 and the plurality of torque transmission struts 94 are provided within the first drive shaft 28. The first drive shaft 28 is a hollow drive shaft. The first drive shaft 28 has a hollow cavity 96. The torsional vibration damper mechanism 90 is arranged within the hollow cavity 96 of the first drive shaft 28.

In an embodiment, the inner disk 92 of the torsional vibration damper mechanism 90 has a hollow cavity 91A and has a plurality of slots 91B for coupling the torsional vibration damper mechanism 90 to the third drive shaft 81 (not shown in FIG. 7). The plurality of torque transmission struts 94 are coupled at a first end 94A to the inner disk 92 and coupled at a second end 94B to the first drive shaft 28 using a plurality of coupling elements 98 (e.g., bolts).

In some embodiments, the vibrational mode shapes of the first drive shaft 28 can be aligned with the vibrational mode shapes of the torsional vibration damper mechanism 90 together with the third drive shaft 81 (not shown in FIG. 7) to reduce torsional vibration in the first drive shaft 28. Flexible attachments can be used to further couple the torsional vibration damper mechanism 90 to the first drive shaft 28 to further limit vibration response by aligning nodes of the first drive shaft 28 with antinodes of the torsional vibration damper mechanism 90 to limit the response. The torsional vibration damper mechanism 90 can be put at any place where damper effectiveness is desired and space is available.

In some embodiments, in addition to the inner disk 92 and to the plurality of torque transmission struts 94, the torsional vibration damper mechanism 90 further includes a plurality of vibration damping inserts 100 that are provided in the hollow cavity 96 between the inner disk 92 and the first drive shaft 28. As shown in FIG. 7, four vibration damping inserts 100 are provided. However, any number of vibration damping inserts 100 (e.g., two or more vibration damping inserts) can be used.

The plurality of vibration damping inserts 100 may include a combination of stiff members and flexible members. For example, the plurality of vibration damping inserts 100 may include a plurality of inverted Y-beam inserts 100A to couple the inner disk 92 of the torsional vibration damper mechanism 90 to the first drive shaft 28. The plurality of inverted Y-beam inserts 100A can be tuned for a torsional vibration mode of interest in the first drive shaft 28. The plurality of vibration damping inserts 100 may further include a plurality of damping elements 100B. The plurality of damping elements 100B are configured to couple the plurality of inverted Y-beam inserts 100A to the inner disk 92 of the torsional vibration damper mechanism 90. The plurality of damping elements 100B may be provided in slots 91C within the inner disk 92. The slots 91C can be provided near the first end 94A of the plurality of torque transmission struts 94. The plurality of vibration damping inserts 100 may also include a plurality of coupling elements 100C. The plurality of coupling elements 100C are configured to couple the plurality of inverted Y-beam inserts 100A to the first drive shaft 28. In an embodiment, the plurality of damping elements 100B may include a viscoelastic material such as a shape memory alloy (SMA). In another embodiment, the plurality of damping elements 100B may include a spring and/or a viscous fluid to provide spring compression and/or fluid friction damping.

Further aspects are provided by the subject matter of the following clauses.

A torsional vibration mechanism for damping tortional vibration of a first drive, a second drive shaft, or both is provided in an aspect of the present disclosure. The torsional vibration damper mechanism includes a third drive shaft mechanically coupled to the first drive shaft, the second drive shaft, or both. The third drive shaft is configured to reduce or substantially to eliminate torsional vibration in the first drive shaft, the second drive shaft, or both.

The torsional vibration damper mechanism according to the above clause, wherein the third drive shaft is directly coupled to the first drive shaft, the second drive shaft, or both.

The torsional vibration damper mechanism according to any of the above clauses, wherein a radius of the third drive shaft is less than a radius of the first drive shaft, the second drive shaft, or both.

The torsional vibration damper mechanism according to any of the above clauses, wherein a mass of the third drive shaft is greater than a mass of the first drive shaft, the second drive shaft, or both.

The torsional vibration damper mechanism according to any of the above clauses, further including a mechanical coupling, the mechanical coupling configured to mechanically couple the third drive shaft to the first drive shaft, the second drive shaft, or both.

The torsional vibration damper mechanism according to any of the above clauses, wherein the third drive shaft is a hollow drive shaft that is provided within a cavity of the first drive shaft, the second drive shaft, or both.

The torsional vibration damper mechanism according to any of the above clauses, further including a plurality of vibration damping inserts provided in a cavity between the third drive shaft and the first drive shaft, the second drive shaft, or both, the plurality of vibration damping inserts configured to mechanically couple the third drive shaft to the first drive shaft, the second drive shaft, or both.

The torsional vibration damper mechanism according to any of the above clauses, the plurality of vibration damping inserts including a plurality of inverted Y-beam inserts configured to couple the third drive shaft to the first drive shaft, the second drive shaft, or both, wherein the plurality of inverted Y-beam inserts are tunable for torsional vibration mode of interest in the first drive shaft, the second drive shaft, or both.

The torsional vibration damper mechanism according to any of the above clauses, wherein the plurality of vibration damping inserts include a plurality of damping elements, the plurality of damping elements being configured to couple the plurality of inverted Y-beam inserts to the third drive shaft.

The torsional vibration damper mechanism according to any of the above clauses, wherein the plurality of damping elements includes a viscoelastic material, a memory alloy (SMA), a spring, or a viscous fluid, or any combination thereof to provide spring compression or fluid friction damping.

The torsional vibration damper mechanism according to any of the above clauses, further including a trapped viscous fluid, the trapped viscous fluid provided in the cavity between the third drive shaft and the first drive shaft, the second drive shaft, or both.

The torsional vibration damper mechanism according to any of the above clauses, wherein the plurality of vibration damping inserts comprise a plurality of inverted Y-beam inserts and a plurality of coupling elements, the plurality of coupling elements being configured to couple the plurality of inverted Y-beam inserts to the first drive shaft.

The torsional vibration damper mechanism according to any of the above clauses, wherein the first drive, the second drive shaft, or both have a first oscillation mode and the third drive shaft has a second oscillation mode, and the second oscillation mode of the third drive shaft limits or reduces the first oscillation mode of the first drive shaft, the second drive shaft, or both.

The torsional vibration damper mechanism according to any of the above clauses, wherein a position of the third drive shaft is adjustable relative to a position of the first drive shaft, the second drive shaft, or both to adjust a torsional vibration dampening.

A torsional vibration damper mechanism for damping tortional vibration of a first drive shaft, a second drive shaft, or both, the torsional vibration damper mechanism including an inner disk and a plurality of torque transmission struts configured to couple the first drive shaft or the second drive shaft with a third drive shaft, wherein the third drive shaft together with the torsional vibration damper mechanism are configured to reduce or substantially to eliminate torsional vibration in the first drive shaft, the second drive shaft, or both.

The torsional vibration damper mechanism according to the above clause, wherein the torsional vibration damper mechanism is arranged within a hollow cavity of the first drive shaft within a how cavity of the second drive shaft, or both.

The torsional vibration damper mechanism according to any of the above clauses, wherein the inner disk of the torsional vibration damper mechanism has a hollow cavity and has a plurality of slots for coupling the torsional vibration damper mechanism to the third drive shaft 81.

The torsional vibration damper mechanism according to any of the above clauses, wherein the plurality of torque transmission struts are coupled at a first end to the inner disk and coupled at a second end to the first drive shaft using a plurality of coupling elements.

The torsional vibration damper mechanism according to any of the above clauses, further including a plurality of vibration damping inserts that are provided in a cavity of first drive shaft between the inner disk and the first drive shaft.

The torsional vibration damper mechanism according to any of the above clauses, wherein the plurality of vibration damping inserts include a plurality of inverted Y-beam inserts to couple the inner disk of the torsional vibration damper mechanism to the first drive shaft or the second drive shaft, or both.

The torsional vibration damper mechanism according to any of the above clauses, wherein the plurality of inverted Y-beam inserts are tuned for a torsional vibration mode of interest in the first drive shaft or the second drive shaft.

The torsional vibration damper mechanism according to any of the above clauses, wherein the plurality of vibration damping inserts include a plurality of damping elements.

The torsional vibration damper mechanism according to any of the above clauses, wherein the plurality of damping elements are configured to couple the plurality of inverted Y-beam inserts to the inner disk of the torsional vibration damper mechanism.

The torsional vibration damper mechanism according to any of the above clauses, wherein the plurality of damping elements are provided in slots within the inner disk.

The torsional vibration damper mechanism according to any of the above clauses, wherein the plurality of vibration damping inserts include a plurality of coupling elements configured to couple the plurality of inverted Y-beam inserts to the first drive shaft or the second drive shaft.

The torsional vibration damper mechanism according to any of the above clauses, wherein the plurality of damping elements include a viscoelastic material, a shape memory alloy (SMA), a spring, or a viscous fluid to provide spring compression and/or fluid friction damping.

According to another aspect of the present disclosure, a turbine engine includes a first drive shaft and a second drive shaft, and a torsional vibration damper mechanism including a third drive shaft mechanically coupled to the first drive shaft, the second drive shaft, or both. The third drive shaft is configured to reduce or substantially to eliminate torsional vibration in the first drive shaft, the second drive shaft, or both.

The turbine engine according to the above clause, wherein the third drive shaft is directly coupled to the first drive shaft, the second drive shaft, or both.

The turbine engine according to any of the above clauses, wherein a radius of the third drive shaft is less than a radius of the first drive shaft, the second drive shaft, or both, or a mass of the third drive shaft is greater than a mass of the first drive shaft, the second drive shaft, or both.

The turbine engine according to any of the above clauses, wherein the torsional vibration damper mechanism further includes a mechanical coupling, the mechanical coupling configured to mechanically couple the third drive shaft to the first drive shaft, the second drive shaft, or both.

The turbine engine according to any of the above clauses, wherein the third drive shaft is a hollow drive shaft that is provided within a cavity of the first drive shaft, the second drive shaft, or both.

The turbine engine according to any of the above clauses, wherein the torsional vibration damper mechanism further includes a plurality of vibration damping inserts provided in a cavity between the third drive shaft and the first drive shaft, the second drive shaft, or both, the plurality of vibration damping inserts configured to mechanically couple the third drive shaft to the first drive shaft, the second drive shaft, or both.

The turbine engine according to any of the above clauses, the plurality of vibration damping inserts including a plurality of inverted Y-beam inserts configured to couple the third drive shaft to the first drive shaft, the second drive shaft, or both, wherein the plurality of inverted Y-beam inserts are tunable for torsional vibration mode of interest in the first drive shaft, the second drive shaft, or both.

The turbine engine according to any of the above clauses, the plurality of vibration damping inserts including a plurality of damping elements, the plurality of damping elements being configured to couple the plurality of inverted Y-beam inserts to the third drive shaft.

The turbine engine according to any of the above clauses, wherein the plurality of damping elements includes a viscoelastic material, a memory alloy (SMA), a spring, or a viscous fluid, or any combination thereof to provide spring compression or fluid friction damping.

The turbine engine according to any of the above clauses, further including a fan assembly, a low-pressure turbine assembly, and a low-pressure compressor assembly, wherein the low-pressure turbine assembly is coupled to the fan assembly and to the low-pressure compressor assembly through the first drive shaft.

The turbine engine according to any of the above clauses, further including a high-pressure turbine assembly and a high-pressure compressor assembly, wherein the high-pressure turbine assembly is coupled to the high-pressure compressor assembly through the second drive shaft.

Although the foregoing description is directed to the preferred embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

I claim:

1. A torsional vibration damper mechanism for damping tortional vibration of a first drive shaft, a second drive shaft, or both, the torsional vibration damper mechanism comprising:

a third drive shaft mechanically coupled to the first drive shaft, the second drive shaft, or both at a first location to provide a first coupling spring constant and at a second location spaced apart from the first location to provide a second coupling spring constant, the second coupling spring constant being greater than the first coupling spring constant, wherein the third drive shaft is configured to reduce or substantially to eliminate torsional vibration in the first drive shaft, the second drive shaft, or both.

2. The torsional vibration damper mechanism according to claim 1, wherein the third drive shaft is directly coupled to the first drive shaft, the second drive shaft, or both.

3. The torsional vibration damper mechanism according to claim 1, wherein a radius of the third drive shaft is less than a radius of the first drive shaft, less than a radius of the second drive shaft, or less than both the radius of the first drive shaft and the radius of the second drive shaft.

4. The torsional vibration damper mechanism according to claim 1, wherein a mass of the third drive shaft is greater than a mass of the first drive shaft, greater than a mass of the second drive shaft, or greater than both the mass of the first drive shaft and the mass of the second drive shaft.

5. The torsional vibration damper mechanism according to claim 1, further comprising a mechanical coupling, the mechanical coupling being configured to mechanically couple the third drive shaft to the first drive shaft, the second drive shaft, or both.

6. The torsional vibration damper mechanism according to claim 1, wherein the first drive shaft, the second drive shaft, or both have a first oscillation mode and the third drive shaft has a second oscillation mode, and the second oscillation mode of the third drive shaft limits or reduces the first oscillation mode of the first drive shaft, the second drive shaft, or both.

7. The torsional vibration damper mechanism according to claim 1, wherein a position of the third drive shaft is adjustable relative to a position of the first drive shaft, the second drive shaft, or both, to adjust torsional vibration dampening.

8. The torsional vibration damper mechanism according to claim 1, wherein the third drive shaft is a hollow drive shaft provided within a cavity of the first drive shaft, the second drive shaft, or both.

9. The torsional vibration damper mechanism according to claim 8, further comprising a plurality of vibration damping inserts provided in the cavity between the third drive shaft and the first drive shaft, the second drive shaft, or both, the plurality of vibration damping inserts being configured to mechanically couple the third drive shaft to the first drive shaft, the second drive shaft, or both.

10. The torsional vibration damper mechanism according to claim 9, wherein the plurality of vibration damping inserts comprise a plurality of inverted Y-beam inserts and a plurality of coupling elements, the plurality of coupling elements being configured to couple the plurality of inverted Y-beam inserts to the first drive shaft.

11. The torsional vibration damper mechanism according to claim 9, wherein the plurality of vibration damping inserts comprise a plurality of inverted Y-beam inserts configured to couple the third drive shaft to the first drive shaft, the second drive shaft, or both, wherein the plurality of inverted Y-beam inserts are tunable for a torsional vibration mode of interest in the first drive shaft, the second drive shaft, or both.

12. The torsional vibration damper mechanism according to claim 11, wherein the plurality of vibration damping inserts comprise a plurality of damping elements, the plurality of damping elements configured to couple the plurality of inverted Y-beam inserts to the third drive shaft.

13. A turbine engine comprising:
a first drive shaft and a second drive shaft; and
a torsional vibration damper mechanism comprising:
a third drive shaft mechanically coupled to the first drive shaft, the second drive shaft, or both at a first location to provide a first coupling spring constant and at a second location spaced apart from the first location to provide a second coupling spring constant, the second coupling spring constant being greater than the first coupling spring constant,
wherein the third drive shaft is configured to reduce or substantially to eliminate torsional vibration in the first drive shaft, the second drive shaft, or both.

14. The turbine engine according to claim 13, wherein the third drive shaft is directly coupled to the first drive shaft, the second drive shaft, or both.

15. The turbine engine according to claim 13, wherein a radius of the third drive shaft is less than a radius of the first drive shaft, less than a radius of the second drive shaft, or less than both the radius of the first drive shaft and the radius of the second drive shaft, or a mass of the third drive shaft is greater than a mass of the first drive shaft, greater than a mass of the second drive shaft, or greater than both the mass of the first drive shaft and the mass of the second drive shaft.

16. The turbine engine according to claim 13, wherein the torsional vibration damper mechanism further comprises a mechanical coupling, the mechanical coupling configured to mechanically couple the third drive shaft to the first drive shaft, the second drive shaft, or both.

17. The turbine engine according to claim 13, wherein the third drive shaft is a hollow drive shaft is provided within a cavity of the first drive shaft, the second drive shaft, or both.

18. The turbine engine according to claim 17, wherein the torsional vibration damper mechanism further comprises a plurality of vibration damping inserts provided in the cavity between the third drive shaft and the first drive shaft, the second drive shaft, or both, the plurality of vibration damping inserts configured to mechanically couple the third drive shaft to the first drive shaft, the second drive shaft, or both.

19. The turbine engine according to claim 18, wherein the plurality of vibration damping inserts comprise a plurality of inverted Y-beam inserts configured to couple the third drive shaft to the first drive shaft, the second drive shaft, or both, wherein the plurality of inverted Y-beam inserts are tunable for a torsional vibration mode of interest in the first drive shaft, the second drive shaft, or both.

20. The turbine engine according to claim 19, wherein the plurality of vibration damping inserts comprise a plurality of damping elements, the plurality of damping elements being configured to couple the plurality of inverted Y-beam inserts to the third drive shaft.

* * * * *